(12) United States Patent
Ito

(10) Patent No.: US 8,744,641 B2
(45) Date of Patent: Jun. 3, 2014

(54) ELECTRIC POWER SUPPLY SYSTEM

(75) Inventor: Akira Ito, Nukata-gun (JP)

(73) Assignee: Denso Corporation, Kariya (JP)

( * ) Notice: Subject to any disclaimer, the term of this patent is extended or adjusted under 35 U.S.C. 154(b) by 0 days.

(21) Appl. No.: 13/485,050

(22) Filed: May 31, 2012

(65) Prior Publication Data

US 2012/0323386 A1  Dec. 20, 2012

(30) Foreign Application Priority Data

Jun. 14, 2011 (JP) ................................. 2011-132596

(51) Int. Cl.
*G05D 5/00* (2006.01)
*G06F 17/00* (2006.01)
*H02J 7/00* (2006.01)

(52) U.S. Cl.
USPC ........... 700/295; 700/291; 705/412; 320/101; 320/109; 320/124; 320/125; 250/203.4

(58) Field of Classification Search
None
See application file for complete search history.

(56) References Cited

U.S. PATENT DOCUMENTS

| | | | | |
|---|---|---|---|---|
| 5,283,511 A | * | 2/1994 | Keener et al. | 320/106 |
| 6,150,793 A | * | 11/2000 | Lesesky et al. | 320/104 |
| 7,256,516 B2 | * | 8/2007 | Buchanan et al. | 307/62 |
| 2006/0033476 A1 | * | 2/2006 | Reynolds et al. | 320/141 |
| 2008/0281663 A1 | * | 11/2008 | Hakim et al. | 705/8 |
| 2009/0192655 A1 | * | 7/2009 | Ichikawa et al. | 700/291 |
| 2011/0125337 A1 | * | 5/2011 | Zavadsky et al. | 700/291 |
| 2012/0176095 A1 | * | 7/2012 | Okuda et al. | 320/134 |

FOREIGN PATENT DOCUMENTS

| | | |
|---|---|---|
| JP | A-6-178461 | 6/1994 |
| JP | A-08-308103 | 11/1996 |
| JP | A-2003-189477 | 7/2003 |
| JP | A-2004-64814 | 2/2004 |
| JP | A-2004-364350 | 12/2004 |
| JP | A-2006-79987 | 3/2006 |
| JP | A-2008-83971 | 4/2008 |

OTHER PUBLICATIONS

Apr. 16, 2013 Japanese Office Action issued in Japanese Patent Application No. JP 2011-132596 (with translation).

* cited by examiner

*Primary Examiner* — Sean Shechtman
(74) *Attorney, Agent, or Firm* — Oliff PLC

(57) ABSTRACT

An electric power supply system has, as multiple storage units, an output type battery of high output and small capacity and a capacity type battery of low output and large capacity. The charge-discharge electric power of each of the storage units is controlled by a controller according to a charge-discharge schedule for a prediction period. Based on a predicted power consumption schedule, a predicted power generation schedule, and a charge-discharge characteristic of each of the storage units, the controller determines a charge-discharge schedule with regards to an optimal evaluation index, and controls the storage units in accordance with the charge-discharge schedule.

4 Claims, 8 Drawing Sheets

ELECTRIC POWER SUPPLY SYSTEM

CROSS REFERENCE TO RELATED APPLICATION

The present application is based on and claims the benefit of priority of Japanese Patent Application No. 2011-132596, filed on Jun. 14, 2011, the disclosure of which is incorporated herein by reference.

TECHNICAL HELD

The present disclosure generally relates to an electric power supply system that controls the charge and discharge of multiple batteries.

BACKGROUND

Conventionally, two types of batteries are known: a capacity type battery and an output type battery. The capacity type battery is a low output large capacity battery suitable for a small electric current discharge over a long period of time. The output type battery is a high output small capacity battery suitable for a large electric current discharge over a short period of time. Japanese Patent Laid-Open No. 2004-364350 (JP '350) discloses a technique for realizing a downsized battery volume by combining the capacity and output type batteries in parallel. Further, Japanese Patent Laid-Open No. 2006-79987 (JP '987) discloses a technique for combining the capacity and output type batteries in an electric vehicle and for controlling the discharge of an electric current from one of the batteries according to a travel condition of the vehicle.

JP '350 and JP '987 respectively disclose a technique of discharging the electric current from a combination of two different types of batteries, but both are silent about the charging (i.e., storage) of electric energy. The two types of electric storage units (i.e., the capacity and output type batteries) may sometimes be installed in a building with a photovoltaic power generation device. In such case, depending on the amount of electricity generated by the photovoltaic power generation device and stored in the electric storage units, electric power not consumable by the building may be stored in the electric storage units or may be returned to a grid-connected power system by reverse flowing electric current. That is, when there are two types of electric storage units installed in the building, controlling the discharge of electric current from one of the electric storage units needs to be considered or scheduled.

Further, the price of a two-in-one type battery that has a capacity of both the capacity type battery and the output type battery may still be high, thereby rendering the use of such battery not feasible in terms of cost and forcing a user to use two types of batteries in parallel.

SUMMARY

In an aspect of the present disclosure, an electric power supply system in a building receives electric power from a power system and provides the electric power through a wiring to an electric load. The electric power supply system may include a photovoltaic power generation unit for generating photovoltaic electric power from sun light.

The electric power supply system may further include a plurality of storage units and a consumption control unit. The plurality of storage units stores the photovoltaic electric power from the photovoltaic power generation unit and the electric power from the power system. The plurality of storage units are coupled to the wiring of the building in order to discharge the electric power.

The consumption control unit controls consumption of the electric power stored in the storage unit, which may be consumed by the storing of the electric power in each of the plurality of storage units, by the electric load, and by reverse-flow of electric power back to the power system.

The storage units include at least two types of storage units with respectively different charge-discharge characteristics. For instance, an output type storage unit of high output and small capacity and a capacity type storage unit of low output and large capacity may be provided.

The consumption control unit determines for each of the storage units a charge-discharge schedule to control a charge-discharge of the electric power of each of the storage units during a prediction period. Specifically, the consumption control unit determines a series of charge-discharge schedules based on (i) a predicted power consumption schedule providing transitional electric power consumption during the prediction period by the electric load based on a use history of the electric load, (ii) a predicted power generation schedule providing transitional electric power generation during the prediction period by the photovoltaic power generation unit based on forecasted weather, and (iii) the charge-discharge characteristics of each of the storage units.

The consumption control unit evaluates the series of charge-discharge schedules by way of an evaluation index. The evaluation index is calculated for each of the charge-discharge schedule, and the consumption control unit controls the charge-discharge of electric power of each of the storage units according to the charge-discharge schedule having an optimal evaluation index.

The electric power supply system may also include an in-vehicle storage unit disposed on a vehicle. The in-vehicle storage unit is capable of storing electric power and discharging electric power stored to the wiring of the building. The consumption control unit determines the charge-discharge schedule as having an optimal evaluation index, based on the predicted power consumption schedule, the predicted power generation schedule, a connection period during which the in-vehicle storage unit is electrically coupled to the wiring, and the charge-discharge characteristics of each of the plurality of storage units including the in-vehicle storage unit.

As described above, the electric power supply system in the present disclosure includes at least an output type storage unit of high output and small capacity and a capacity type storage unit of low output and large capacity. The charge-discharge of electric power of the two types of storage units having respectively different charge-discharge characteristics is controlled by the consumption control unit. The consumption control unit controls charge-discharge of electric power of each of the storage units during the prediction period according to a charge-discharge schedule. The charge-discharge schedule shows transition of charge and discharge of each of the plurality of storage units during the prediction period.

The evaluation index may be, for example, a cost of the electric power or an emission amount of carbon dioxide. The consumption control unit may control the charge-discharge of electric power of each of the plurality of storage units according to the charge-discharge schedule having the lowest cost of electric power (i.e. the optimal evaluation index) or the lowest emission of carbon dioxide (i.e. the optimal evaluation index). Therefore, even when there are two or more types of storage units having respectively different charge-discharge characteristics, the control of those storage units is performed in a manner that maximizes superior characteristics of respective battery types, taking advantages of having at least two types of storage units. Thus, the plurality of storage units are efficiently used.

BRIEF DESCRIPTION OF THE DRAWING

Other objects, features and advantages of the present invention will become more apparent from the following detailed description disposed with reference to the accompanying drawings, in which.

DETAILED DESCRIPTION

The present disclosure is described with reference to the drawings.

Figure 1:
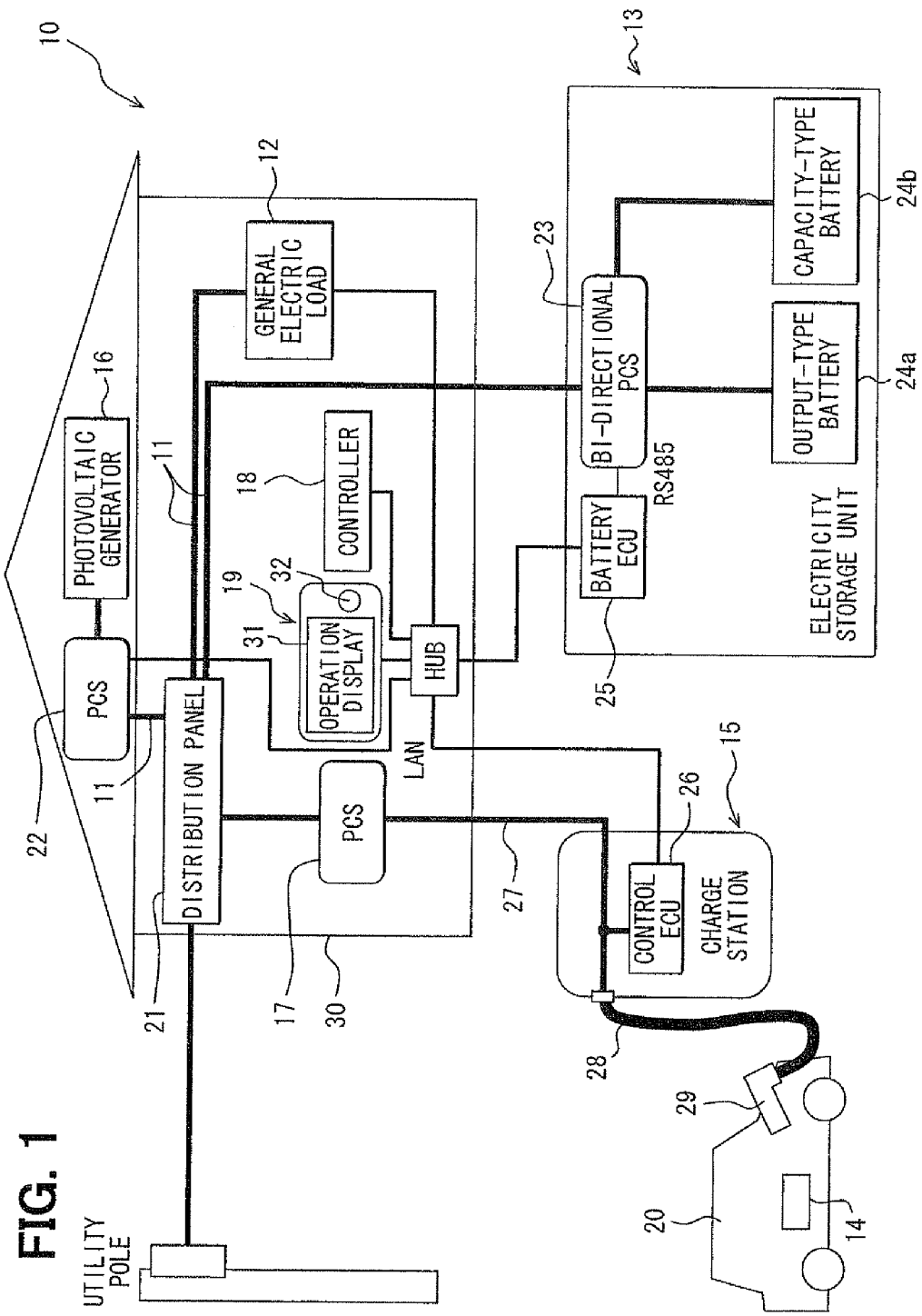
FIG. 1 is a block diagram of an electric power supply system of the present disclosure.

With reference to FIG. 1, an electric power supply system 10 is a system that receives an electric power from a power system (i.e., a power grid) of a power supplier (i.e., an electric power company) based on a power supply contract. The electric power supply system 10 provides the electric power to a general electric load 12 coupled to an alternating current electric power wiring 11 of a building 30. The alternating current electric power wiring 11 may be referred to as electric wiring 11.

In the present embodiment, the electric power supply system 10 may receive the electric power based on a power supply contract. The power supply contract may provide for a lower price rate for electric power during a certain time zone (i.e. time period), such as a mid-night time zone, which may be from 24:00 to 7:00. In the following, the mid-night time zone is provided as the time zone in which the price rate for electric power is the lowest. However, the time zone in which the price rate for electric power is the lowest is not limited to the mid-night times zone, and may vary. The term time zone refers to a period of time or duration during a day (i.e. 24 hrs). The electric wiring 11, which receives the electric power from the power system of the electric supplier, has a time-zone conscious electric power meter wattmeter: not illustrated) disposed thereon.

The electric power supply system 10 includes the electric wiring 11 disposed in the building 30, an electrical storage unit 13 electrically coupled to the electric wiring 11, a charge station 15, a photovoltaic generator 16 for generating electric power from sun light, and the general electric load 12 electrically coupled to the electric wiring 11. In addition the electric power supply system 10 includes a controller 18 for controlling each component of the electric power supply system 10, and an operation display 19 for operating each component. The charge station 15 provides the electric power to a vehicle 20 from the electric wiring 11 for charging an in-vehicle battery 14. The vehicle 20 is a vehicle that is equipped with a relatively-large capacity battery, such as a plug-in hybrid vehicle.

The electric wiring 11 wired in the building 30 may be, for example, a single-phase three-line type wiring (i.e., a wiring having one neutral line and two power lines), and receives the electric power (i.e., a grid-connected power) from the power system of the power supplier through a distribution panel 21. The distribution panel 21 is equipped with, though not illustrated, a main breaker and an electric current breaker for limiting the maximum electric current for each of the circuit systems, equipped with an electricity leakage detection function.

From the distribution panel 21, the electric wiring 11 diverges into four lines. The first line is to a discharge power conditioner (PCS) 17, the second line is to a photovoltaic generator PCS 22, the third line is to a bi-directional PCS 23, and the fourth line is to the general electric load 12. In such manner, the general electric load 12 of various electric apparatuses (i.e., electric loads) is coupled to the electric wiring 11 to receive the electric power.

The photovoltaic generator 16 is a photovoltaic power generation device, and supplies electric power that is external to the grid-connected power to the electric wiring 11. The photovoltaic generator 16 generates electric power by using a photovoltaic panel disposed on a roof of the building 30 (not illustrated) to receive sun light. The photovoltaic generator 16 supplies the generated photovoltaic electric power to the photovoltaic generator PCS 22. The photovoltaic generator PCS 22 is electrically coupled to the electric wiring 11, and discharges an alternating current to the electric wiring 11 by converting a direct current to the alternating current. The photovoltaic generator PCS 22 is also connected to a local area network (LAN), communicating with other components.

The electrical storage unit 13 may be disposed outside of the building 30, and is coupled to the electric wiring 11. The electrical storage unit 13 may be designated as an electrical storage system, or as an "e-Station." The electrical storage unit 13 includes the bi-directional PCS 23, an output type battery 24a, a capacity type battery 24b, and a battery ECU 25.

The output type battery 24a is an electrical energy storage unit of high output and small capacity. The output type battery 24a can charge/discharge a large electric current to/from the capacity type battery 24b, with superior large electric current characteristics. For example, the output type battery 24a has a storage capacity of 2 kWh, the maximum charge capacity of 6 kW, and the maximum discharge capacity of 6 kW.

The capacity type battery 24b is an electrical energy storage unit of low output and large capacity. The capacity type battery 24b has a larger energy storage capacity in comparison to the output type battery 24a, capable of storing a large amount of electrical energy. For example, the capacity type battery 24b has a storage capacity of 6 kWh, the maximum charge capacity of 3 kW, and the maximum discharge capacity of 3 kW. The output type battery 24a and the capacity type battery 24b may be referred to as the batteries 24a, 24b.

Each of the batteries 24a, 24b is a collection of battery units of a secondary battery, such as a lithium ion battery. The batteries 24a, 24b have respectively different cathode active materials and anode active materials. Thus, the batteries 24a, 24b have respectively different charge-discharge characteristics. The batteries 24a, 24b are electrically coupled to the electric wiring 11 in parallel through the bi-directional PCS 23, and are capable of being charged by the alternating current from the electric wiring 11 and are capable of discharging stored direct current to the electric wiring 11 individually via the bi-directional PCS 23.

The battery ECU 25 is coupled to the bi-directional PCS 23 through a communication line, and controls the operation of the bi-directional PCS 23 according to a communication standard, such as RS. Further, the battery ECU 25 can communicate with a battery monitor ECU (not illustrated) disposed on each of the batteries 24a, 24b through the bi-directional PCS 23. The battery ECU 25 is coupled through LAN to the operation display 19 and to a control ECU 26 of the charge station 15 through a hub, communicating (i.e., transmitting) information with each other.

The charge station 15 is disposed outside of the building 30 as a separate unit from the electrical storage unit 13. The charge station 15 is coupled to a charge power line 27 through the discharge PCS 17, and the charge power line 27 diverges from the electric wiring 11 at the distribution panel 21. The charge station 15 supplies the electric power from the charge power line 27 to the in-vehicle battery 14 on the vehicle 20, and discharges the electric power from the in-vehicle battery 14 to the charge power line 27. When the in-vehicle battery 14 discharges electricity, the discharge PCS 17, which is electrically coupled to the electric wiring 11, converts a direct current from the charge station 15 to an alternating current that is discharged to the electric wiring 11.

The charge power line 27 is wired to inside of the charge station 15, and is coupled to a charge-discharge cable 28 that extends from a body of the charge station 15 to outside of the charge station 15. A charge-discharge connector 29, serving as a connection terminal part, is attached to an end of the charge-discharge cable 28. Further, the charge station 15 includes a control pilot (CPLT) board (not illustrated), a power line communication (PLC) unit (not illustrated), and the control ECU 26. The control ECU 26 controls charge-discharge of electricity to/from the in-vehicle battery 14, which serves as an in-vehicle storage unit, by communicating with the CPLT board, the PLC unit, the battery ECU 25, and the operation display 19.

A CPLT line and a ground (GND) line are disposed together with a power line in the charge-discharge cable 28, to allow communication of a CPLT signal. The CPLT board performs a charge control of the in-vehicle battery 14 as its main function. For example, the CPLT board can communicate with the control ECU 26 through the communication standard RS.

The PLC unit communicates with the vehicle 20 side through the power line in the charge-discharge cable 28. For example, the PLC unit can communicate with the control ECU 26 through a universal asynchronous receiver-transmitter (UART) for a serial communication of asynchronous communication (i.e., an asynchronous method).

The vehicle 20 has a connector, such as inlet, to couple with the charge-discharge connector 29. By coupling the connector of the vehicle 20 to the charge-discharge connector 29 of the charge station 15, the in-vehicle battery 14 is charged and discharged by an in-vehicle charge-discharge apparatus (not illustrated). When the in-vehicle battery 14 is charging, the alternating current is supplied to the connector, and the in-vehicle charge-discharge apparatus converts the electric power into the direct current for charging the in-vehicle battery 14. On the other hand, when discharging the in-vehicle battery 14, the direct current stored in the in-vehicle battery 14 is converted by the discharge PCS 17 into the alternating current for discharging to the charge power line 27. The DC-AC conversion may be performed by the in-vehicle charge-discharge apparatus.

The in-vehicle battery 14 is an output type storage unit of high output and small capacity. Therefore, the in-vehicle battery 14 has charge-discharge characteristics similar to the output type battery 24a. The in-vehicle battery 14 has superior large electric current characteristics. For example, the in-vehicle battery 14 has a storage capacity of 2 kWh, the maximum charge capacity of 6 kW, and the maximum discharge capacity of 6 kW.

The operation display 19 is a remote operation unit, or a remote controller, for example, in the building 30. The operation display 19 is coupled to each component through LAN. The operation display 19 includes a display unit 31 that serves as a notification unit and an operation switch 32 for controlling each component. The display unit 31 may, for example, display a storage condition of each of the batteries 24a, 24b, a power generation amount of the photovoltaic generator 16, an electric power consumption of the general electric load 12, a charge condition of the in-vehicle battery 14, and an amount of reverse-flow of the electric power back to the power system. Further, by operating the operation switch 32, an electrical storage instruction to each of the batteries 24a, 24b, a charge instruction to the in-vehicle battery 14, as well as various settings, are transmitted and/or performed.

The controller 18 has a function of the consumption control unit for controlling each component. The controller 18 is coupled to each component through LAN just like the operation display 19. The controller 18 provides to each component a control instruction according to instructions provided by the operation switch 32 of the operation display 19 for the operation of each component. Further, the controller 18 controls the display unit 31 of the operation display 19 to display information of each component. The controller 18 includes, though not illustrated, an input circuit for receiving communication signals and detection signals from an atmospheric pressure sensor (not illustrated), a microcomputer for performing various operations by using a signal from the input circuit, and an output circuit for outputting a control signal that controls each component based on the operation of the microcomputer. The microcomputer has a memory unit, such as ROM, RAM, for storing various data, such as the atmospheric pressure, as well as storing the operation results, controlling various preset programs and updatable control programs for performing various processes.

The controller 18 calculates a predicted electric power amount consumed by the general electric load 12 for a prediction period based on a use history of the general electric load 12, and also calculates a predicted power generation amount of the photovoltaic generator 16 for the prediction period based on a forecasted weather. The prediction period may be provided as a 24 hours time period starting from the time the calculation is made to 24 hours later. The controller 18 determines the forecasted weather for the prediction period based on the detection value of the atmospheric pressure detected by the atmospheric pressure sensor. Accordingly, the controller 18 calculates the predicted power generation amount of the photovoltaic generator 16 for the prediction period based on the forecasted weather and a history of the power generation amount of the photovoltaic generator 16.

Further, the controller 18 calculates a predicted power consumption schedule and a predicted power generation schedule. The predicted power consumption schedule provides an anticipated transition of electric power consumption (i.e., a series of transiting power consumption values) that may be consumed by the general electric load 12 during the prediction period according to the use history of the general electric load 12. The predicted power generation schedule provides an anticipated transition of electric power generation (i.e., a series of transiting power generation values) generated by the photovoltaic generator 16 during the prediction period according to the forecasted weather. Values in the predicted power consumption schedule and the predicted power generation schedule may be calculated hourly, every minute, or other unit of time.

The controller 18 controls the electric power charged to each of the batteries 24a, 24b and to the in-vehicle battery 14, and controls the electric power discharged from each of the batteries 24a, 24b and from the in-vehicle battery 14 to the electric wiring 11 according to a charge-discharge schedule stored in the memory unit. The charge-discharge schedule is determined based on the predicted power consumption schedule, the predicted power generation schedule and the charge-discharge characteristics of each of the batteries 24a, 24b and the in-vehicle battery 14.

A weather forecasting operation by the controller 18 is performed based on the detected atmospheric pressure value, a fluctuation ratio of the atmospheric pressure value concerned and parameters of a change rate of the atmospheric pressure value concerned, and determines the amount of photovoltaic power generation during the prediction period. For example, the controller 18 stores in the memory unit a predetermined map used for the weather forecasting operation. The fluctuation ratio of the atmospheric pressure value concerned is divided into two parts in the map, and, in each of the two parts, inequalities regarding the change rate of the atmospheric pressure value are divided into two groups, and, to each of the two groups, an inequality regarding the atmospheric pressure value is assigned. Therefore, by applying parameters of the atmospheric pressure value, the fluctuation ratio, and the change rate to the map, the predicted power generation amount is calculated.

The atmospheric pressure value in such calculation may be provided as a currently detected value. In addition, the fluctuation value and the change rate, may be provided as the fluctuation value and the change rate during a period from, for example 4 hours before, up to now. Therefore, the controller 18 stores in the memory unit the map that shows a correlation between the past atmospheric pressure data and the amount of past photovoltaic power generation. The controller 18 determines the amount of photovoltaic power generation (i.e., a predicted power generation amount) during the prediction period based on the atmospheric pressure by utilizing the map. Such a map may preferably be updated by memorizing the past atmospheric pressure data and the amount of past power generation results in a successive manner.

Further, the controller 18 operates the electrical storage unit 13 to charge each of the batteries 24a, 24b during the mid-night time zone in order to receive the lower price rate for the electric power. Each of the batteries 24a, 24b is brought to full electric charge (i.e., stores the maximum storage amount of electrical charge/energy) in the mid-night time zone.

Figure 2:
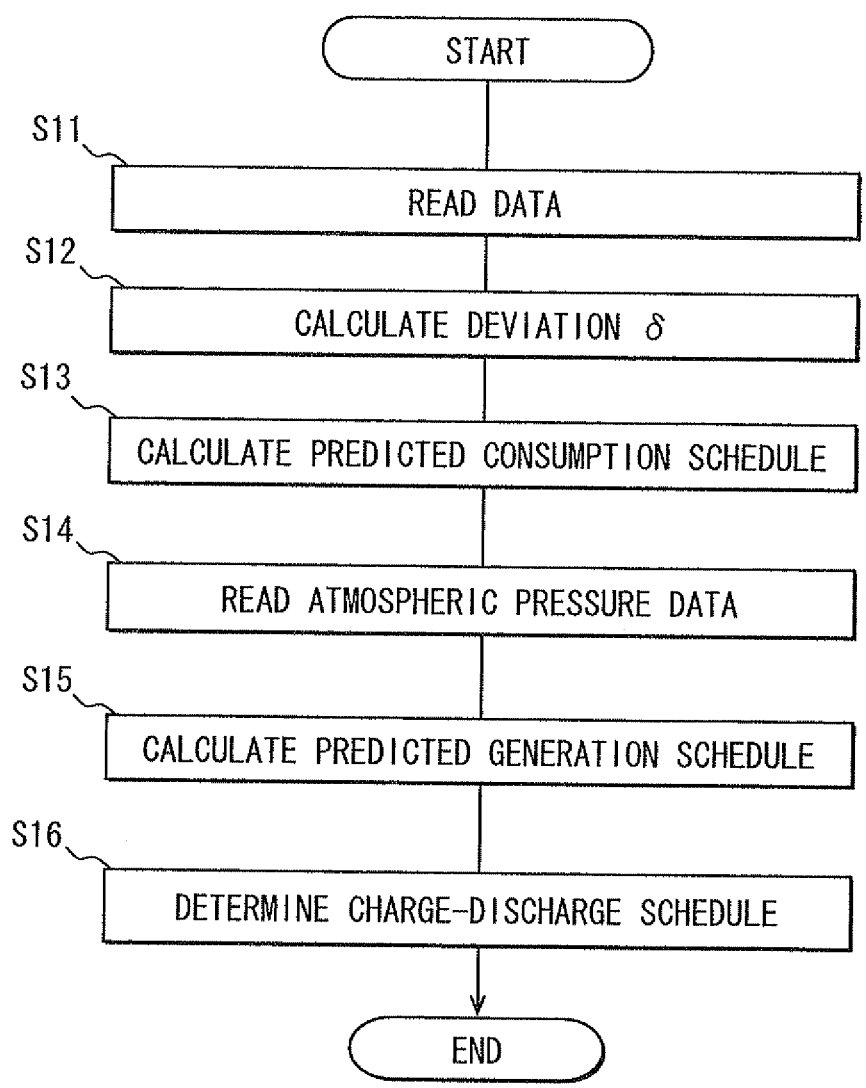
FIG. 2 is a flowchart of a charge-discharge schedule determination process of the present disclosure.

With reference to FIG. 2, a charge-discharge schedule determination process performed by the controller 18 is described. The charge-discharge schedule determination process is a process to determine the charge-discharge schedule. The process is performed in a power-on condition of the controller 18, and is repeated regularly, that is, for example, it may be performed once every 30 minutes.

The process is started, in S11, performs a read procedure to read data, such as data of past transition of consumed electric power by the general electric load 12 (i.e. history data), data of past transition of the photovoltaic power generation. The records of the past operation may be records from a predetermined number of days, such as records of seven days. In addition the records of the past operation may be categorized into two types, weekday operation records and weekend operation records (i.e., for Saturday and Sunday). The data of the past records are selectively read according to the day of the week of the operation of the charge-discharge schedule determination process.

Based on the records of the consumed electric power, a deviation 8 of the consumed electric power is calculated in 512. In S13, a predicted power consumption schedule of the prediction period is determined as a total of an average value of the consumed electric power and the deviation δ. Therefore, the predicted power consumption schedule is a total of (i) average of the records of the consumed electric power and (ii) the deviation. The result of the consumed electric power includes the consumption by the in-vehicle battery 14 on the vehicle 20. Further, when the prediction is performed, an operation schedule of the vehicle 20 in the prediction period is read for the calculation of the predicted power consumption schedule. Further, when a use plan of the general electric load 12 in the prediction period by the user is provided in advance, the use plan may be read for determining the predicted power consumption schedule. The use plan may not only be a concrete use plan of the general electric load 12, but may also be, for example, an action plan of the user, such as a staying at home on a day of the week that is usually planned as a work day. In other words, learning data of the consumed electric power based on the records of the used electric power is generated from the past data including attributes such as a season, a day of the week, a time of the day, staying at home or not, and a parking condition of the vehicle 20.

In S14, the atmospheric pressure data stored in the memory unit is read, such that the atmospheric pressure data up to now from, for example four hours before, is entirely read. Further, though a time period for collecting atmospheric pressure data in S14 is defined as four hours, such time period may have a different predetermined value.

In S15, based on the atmospheric pressure data, the predicted power generation schedule during the prediction period is calculated. Specifically, in S15, the predicted power generation schedule is determined by utilizing the correlation map correlating the atmospheric pressure with the amount of the photovoltaic power generation and by applying the parameters of the read data of the atmospheric pressure value, the fluctuation ratio of the atmospheric pressure value, and the change rate of the atmospheric pressure value to the map.

In S16, the charge-discharge schedule is determined based on the predicted power consumption schedule, the predicted power generation schedule, and the charge-discharge characteristics of each of the batteries 24a, 24b and the in-vehicle battery 14, the charge-discharge schedule is determined, and the present process is finished. For determining the charge-discharge schedule, the predicted power consumption schedule, the predicted power generation schedule, and the charge-discharge characteristics of each of the batteries 14, 24a, 24b are used to calculate an evaluation index. A charge-discharge schedule that provides for an optimal evaluation index is provided as the charge-discharge schedule for controlling the batteries 24a, 24b, and the in-vehicle battery 14, when it is coupled to the system 10.

The evaluation index may be provided as an electric power price balance (i.e. cost of electric power), which is calculated by subtracting (i) a sell price of electric power according to the amount of the reverse-flow to the electric wiring 11 from (ii) a purchase price of electric power according to the amount of the supplied electric power from the electric wiring 11. More practically, such electric power price balance is calculated by subtracting (i) the sell price that is derived from multiplication of a unit sell price by the reverse-flow electric power amount from (ii) the purchase price that is derived from multiplication of a unit purchase price by the supplied electric power amount. The electric power price balance may be an amount paid for electric power to the power supplier or an amount received for electric power from the power supplier. Specifically, when the balance takes a positive value, the balance is paid to the power supplier from the user, and when the balance takes a negative value, the balance is paid to the user from the power supplier. Accordingly, an electric power price balance with the lowest value may be provided as the optimal evaluation index.

Based on the predicted power consumption schedule, the predicted power generation schedule, and the charge-discharge characteristics of each of the batteries 14, 24a, 24b, a series of charge-discharge schedule may be determined for the optimal evaluation index. When the evaluation index is provided as the electric power price balance, the charge-discharge schedule with the lowest electric power price balance (i.e. lowest cost) is provided as the charge-discharge schedule that is used to control the charge and discharge of the batteries 24a, 24b and, when applicable, the in-vehicle battery 14.

The charge-discharge schedule of the prediction period is set by such charge-discharge schedule determination process. Because the process in the present flowchart is performed regularly, the charge-discharge schedule is appropriately updated according to the latest prediction of the weather, or the latest weather forecast.

The relationship between consumed electric power by the general electric load 12 and time is described in the following with reference to FIGS. 3-8. In FIGS. 3-8, the horizontal axis (i.e. X-axis) is a measurement of time, and the vertical axis (Y-axis) is a measurement of power (kW). Specifically, the diagrams provide the photovoltaic power generation amount (kW), the charge-discharge electricity amount of each of the storage units 24a, 24b (kW), the state of charge (SOC) of each of the storage units 24a, 24b (kWh), a net consumption of electric power (kW), and an in-house consumption of electric power (kW) over time. In the following, the price of electric power may be provided, for example, as 21.2 Yen/kWh for time zones of 7:00 to 9:00 and 17:00 to 24:00, 31.4 Yen/kWh for time zones of 9:00 to 17:00, and 9.3 Yen/kWh for time zones of 24:00 to 7:00 (mid-night time zone). In addition, the sell price may be a fixed rate, such as 48 Yen/kWh for all time.

Figure 3:
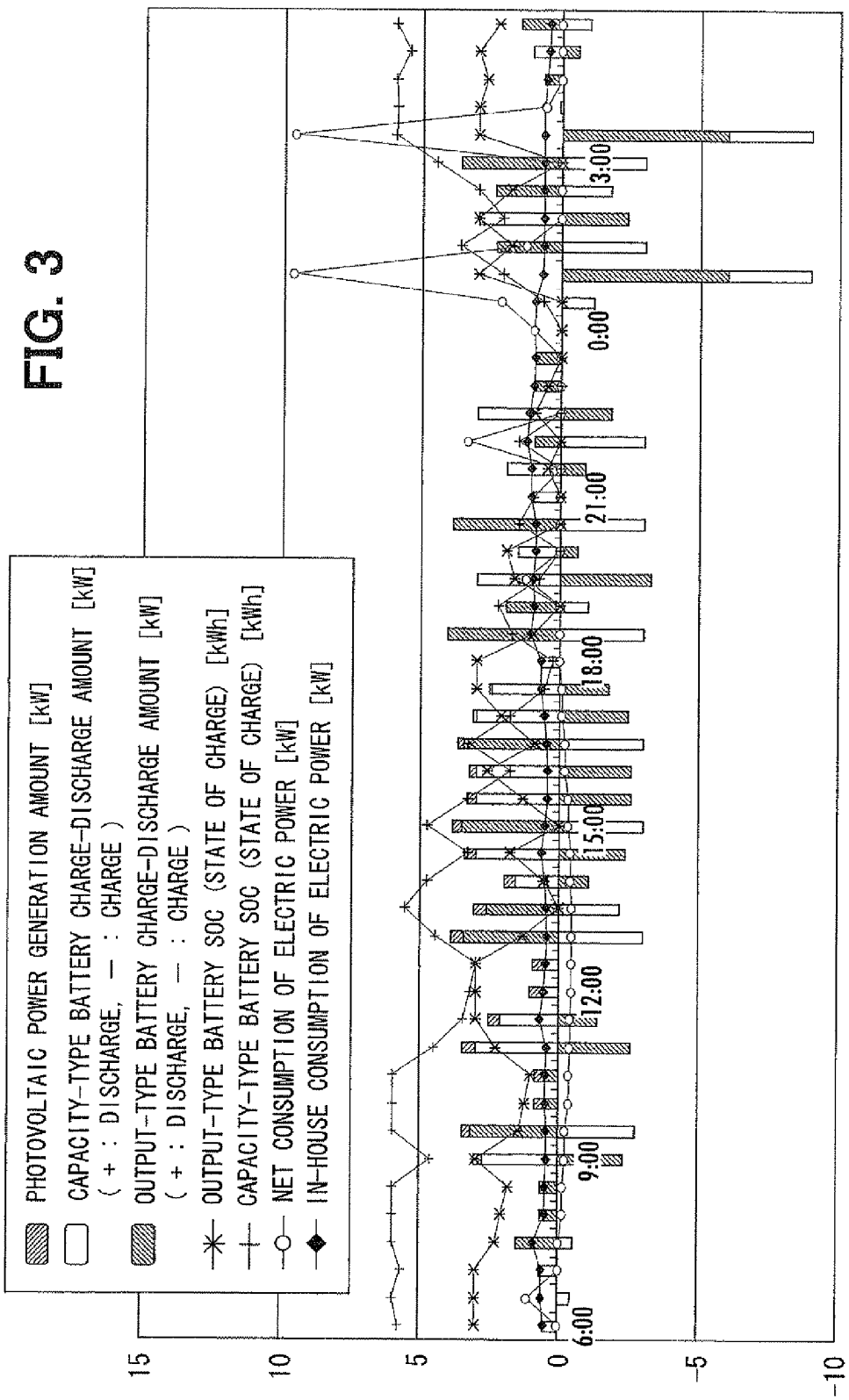
FIG. 3 is a first example diagram of relationship between the time of day and the electric power consumption.

FIG. 3 is the first example diagram of depicting the relationship between the time of day and the electric power consumption. In FIG. 3, the in-vehicle battery 14 is not connected to the charge station 15. Therefore, the output type battery 24a and the capacity type battery 24b are used as the storage units.

The controller 18 controls the charge-discharge electric power of each of the batteries 24a, 24b, according to the charge-discharge schedule. As the control of the charge-discharge of electric power, while one of the batteries 24a, 24b is charging, the other one of the batteries 24a, 24b may be discharging. In the example of FIG. 3, the cost of electric power for the operation of both the batteries 24a, 24b is 1.9 Yen. In contrast, when the same amount of electric power is consumed, the conventional electric power supply system using the photovoltaic power generation unit and without using the electrical storage unit 13 has to pay about 211 Yen for the price of the electric power for the same 24 hours. Therefore, by using the batteries 24a, 24b, the cost of the electric power is reduced.

Figure 4:
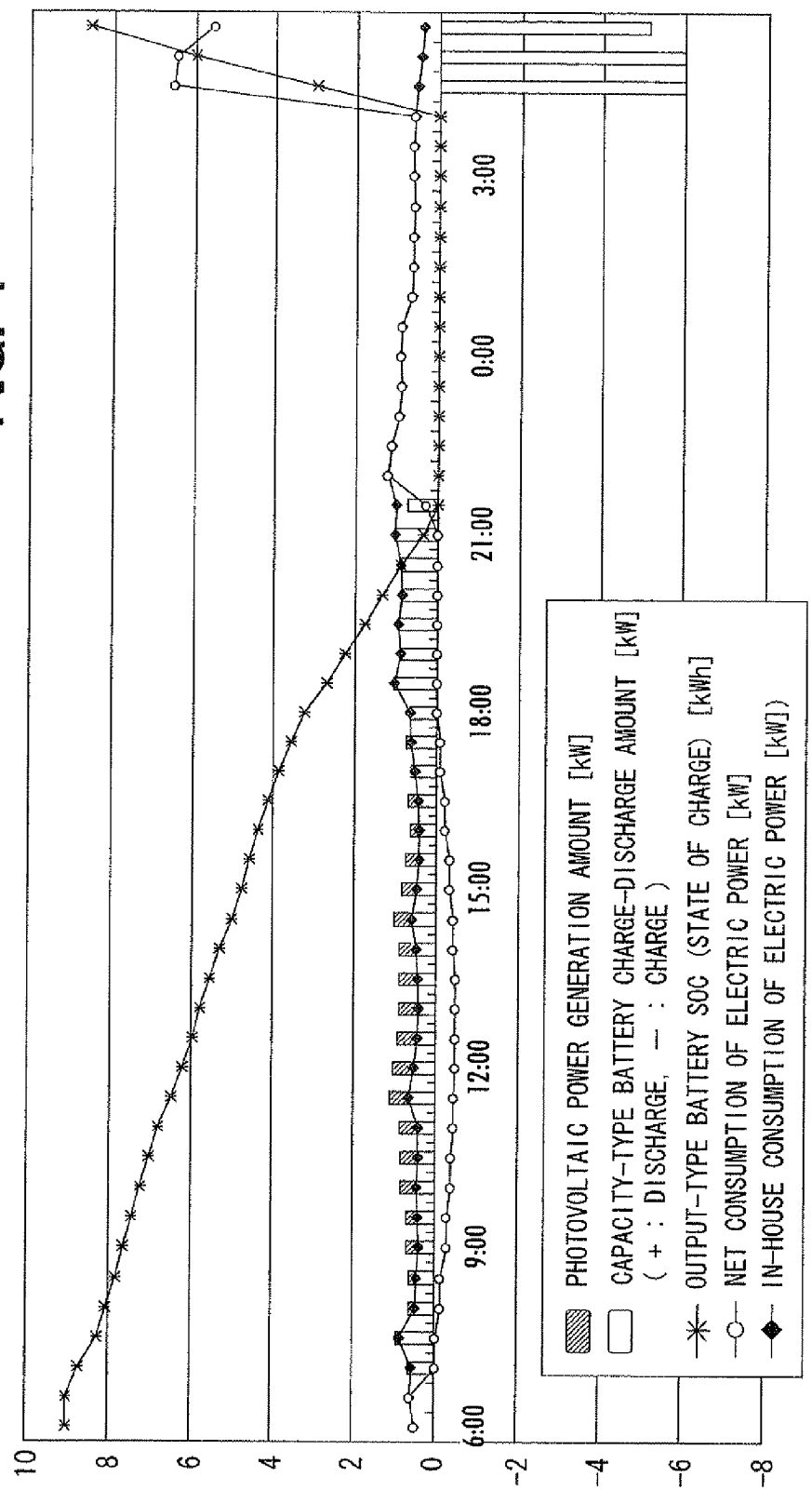
FIG. 4 is a diagram of a comparison example.

In FIG. 4, the diagram shows a case in which one battery is used instead of using two batteries for the electric power supply system. The battery in the example of FIG. 4 is a high output large capacity battery, having a storage capacity of 9 kWh, the maximum charge capacity of 6 kW, and the maximum discharge capacity of 6 kW, and may be more expensive than the total price of the batteries 24a, 24b. When the battery is used, the electric power stored in during mid-night time zone is used as the daytime electric power consumption. The cost of the electric power for the example of FIG. 4 is 4.6 Yen. Therefore, the system 10 of the present disclosure that uses two batteries 24a, 24b has a lower electric power cost than the system of FIG. 4.

Figure 5:
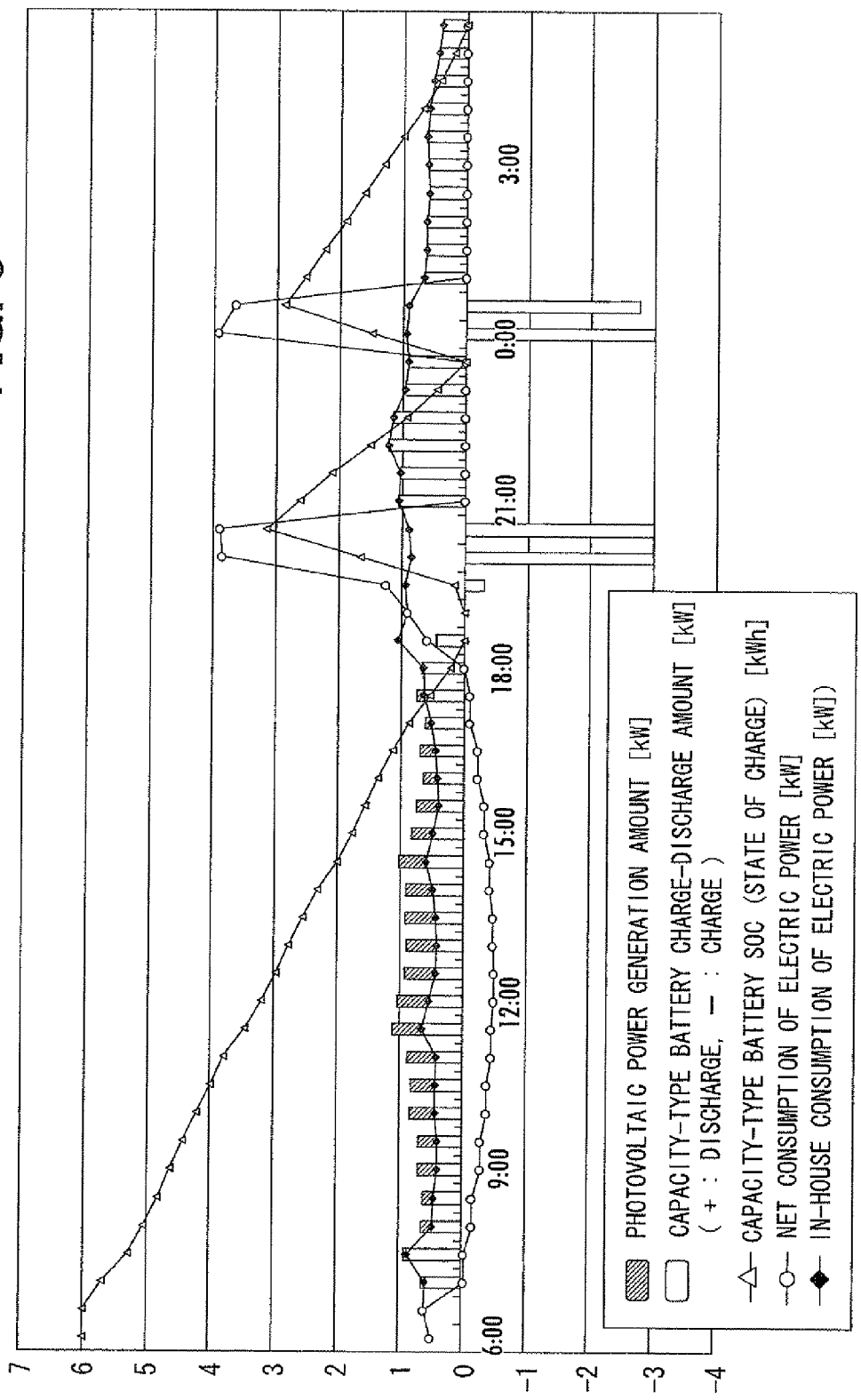
FIG. 5 is a second example diagram of relationship between the time of day and the electric power consumption.
Figure 6:
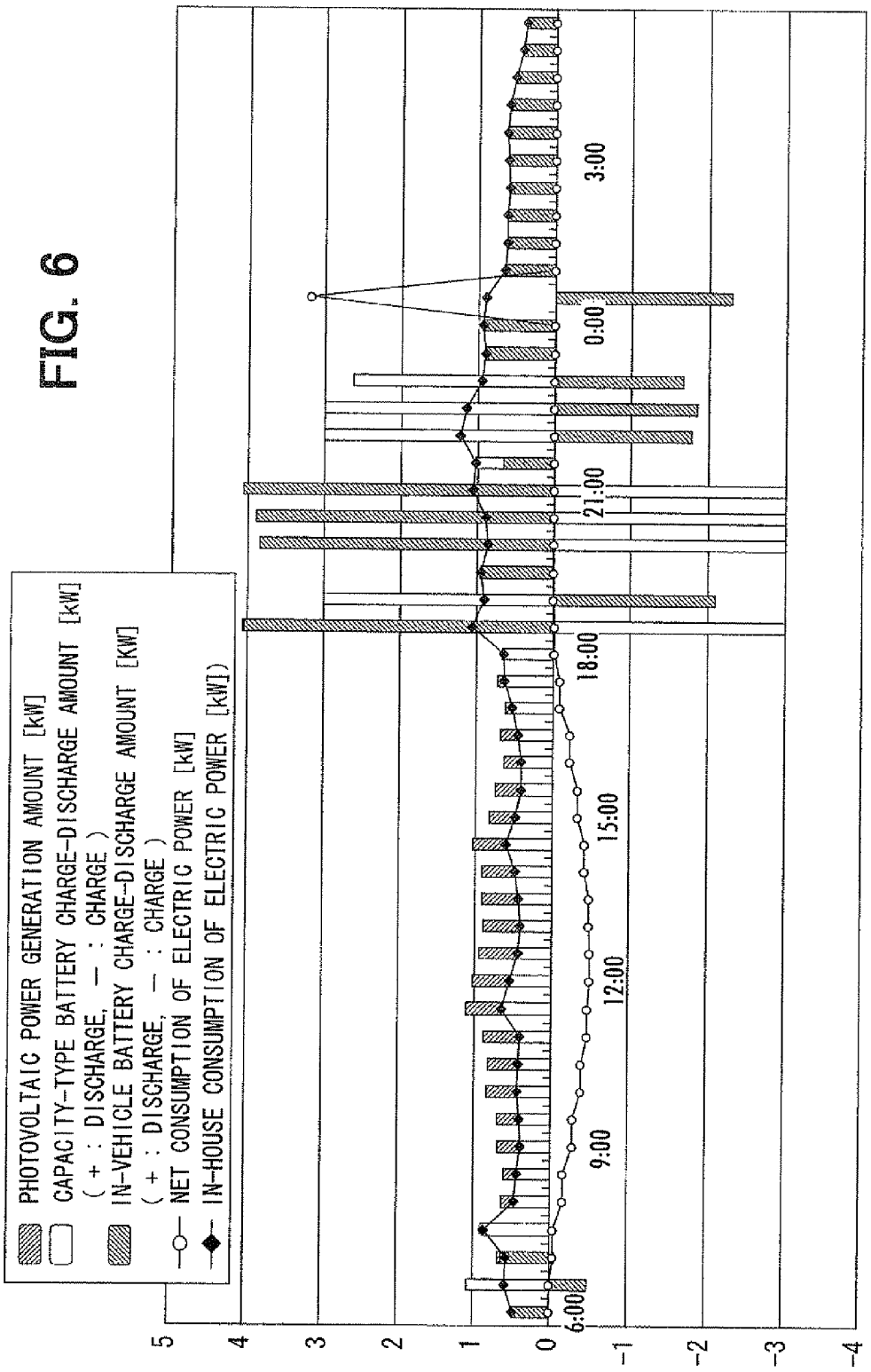
FIG. 6 is a third example diagram of relationship between the time of day and the electric power consumption.

FIG. 5 is the second example diagram of relationship between the time of day and the electric power consumption. FIG. 6 is the third example diagram of relationship between the time of day and the electric power consumption. In FIG. 5 and FIG. 6, the output type battery 24a is replaced with the in-vehicle battery 14. Further, in FIG. 5, only the capacity type battery 24b serves as the electricity storage unit, due to the use of the vehicle 20, and, in FIG. 6, the vehicle 20 is used during a time from 7:30 to 18:00, and the in-vehicle battery 14 can be used in other time zones.

In FIG. 5, since only the capacity type battery 24b serves as the electrical storage unit 13, the cost of the electric power is −11 Yen (i.e., selling of the electric power yields an income of 11 Yen). When the in-vehicle battery 14 is used together with other batteries as shown in FIG. 6, the price of the electric power is −148 Yen, or an income of 148 Yen. Therefore, if the electric power supply system 10 has the capacity type battery 24b only, it still reduces the electric power cost by using the in-vehicle battery 14.

Figure 7:
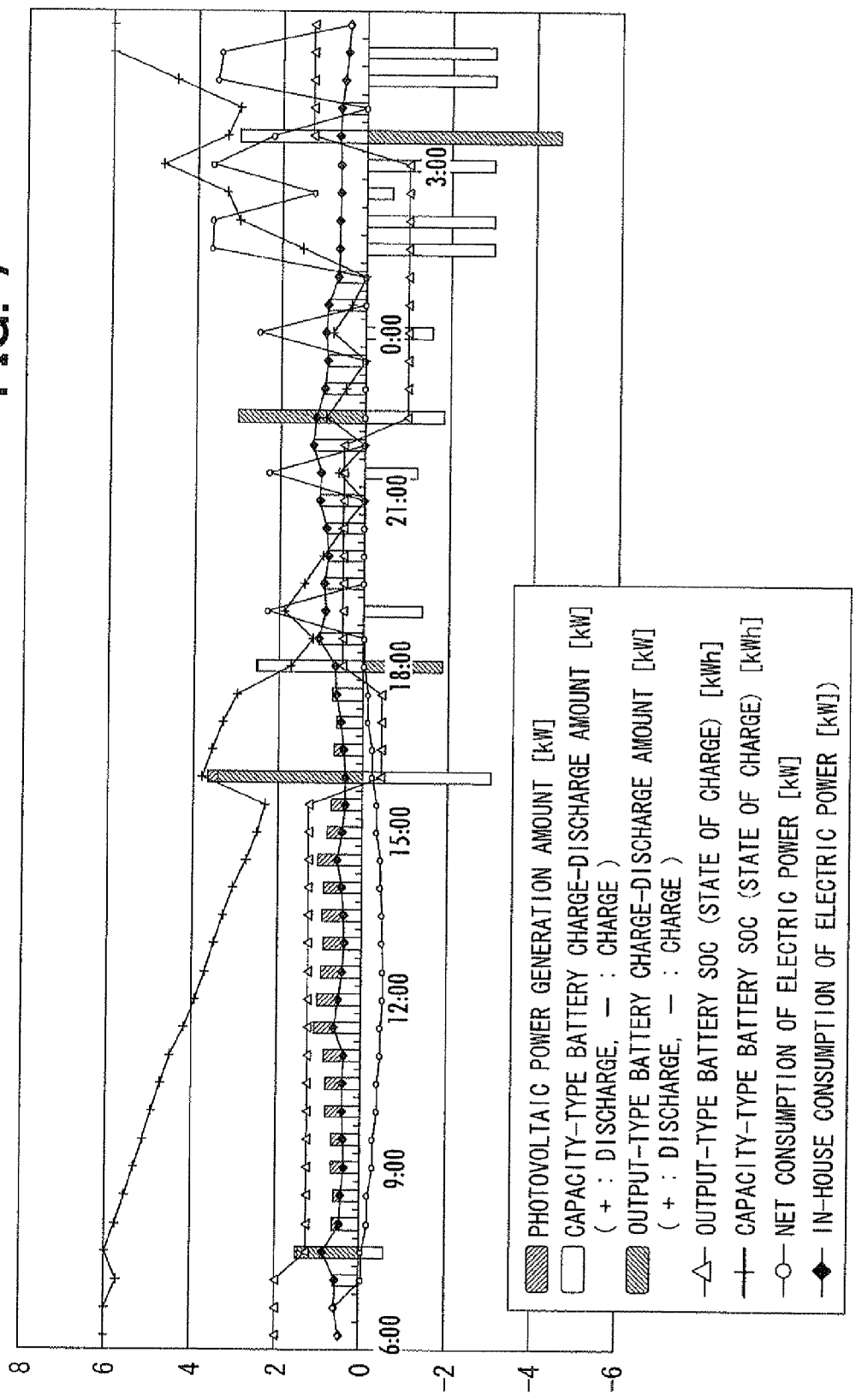
FIG. 7 is a fourth example diagram of relationship between the time of day and the electric power consumption.
Figure 8:
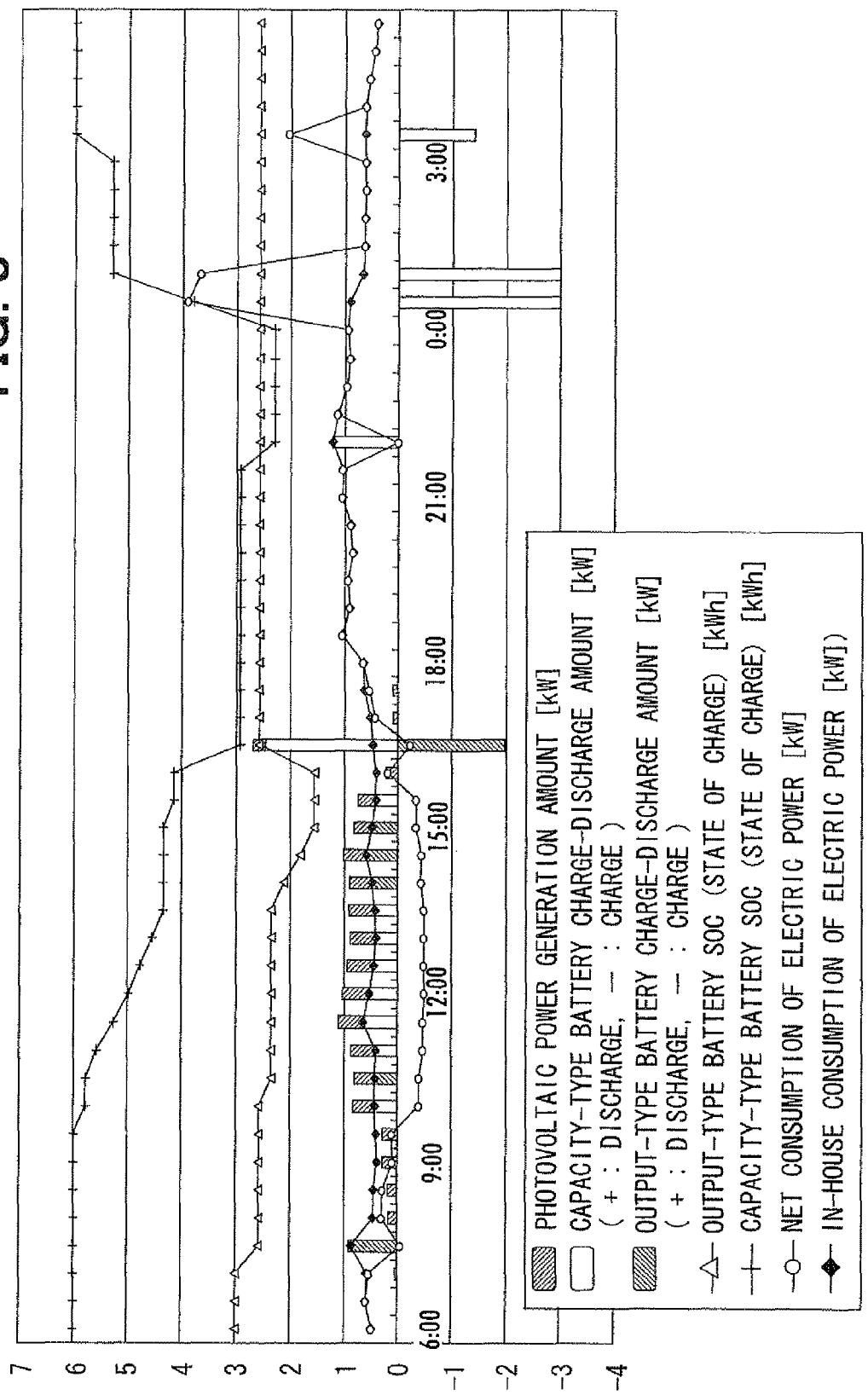
FIG. 8 is a fifth example diagram of relationship between the time of day and the electric power consumption.

FIG. 7 is the fourth example diagram of relationship between the time of day and the electric power consumption, and FIG. 8 is the fifth example diagram of relationship between the time of day and the electric power consumption. In FIG. 7 and FIG. 8, for the purpose of preventing the deterioration of the batteries 24a, 24b caused by the charge-discharge of electricity, the number of charge-discharge operations is restricted. In FIG. 7, the maximum number of charge-discharge operations of the output type battery 24a is set to 5 times in 24 hours (i.e., 5 charge operations and 5 discharge operations in 24 hours), with no restriction set for the number of charge-discharge operations of the capacity type battery 24b. In FIG. 8, the maximum number of charge-discharge operations of the output type battery 24a is set to 5 times in 24 hours (i.e., 5 charge operations and 5 discharge operations in 24 hours), and the maximum number of charge-discharge operations of the capacity type battery 24b is set to 10 times in 24 hours (i.e., 10 charge operations and 10 discharge operations in 24 hours).

In FIG. 7, the charge-discharge operations are performed in an optimum manner because of the restriction of the number of charge-discharge operation, and the cost of the electric power is 1.9 Yen. In contrast, since a restriction on the number of charge-discharge operations is provided for the capacity type battery 24b in the example of FIG. 8, the cost of electric power is increased to 83.2 Yen. The restrictions on the number of charge-discharge operations can be set by the user through the operation switch 32. By providing a restriction on the number of charge-discharge operations, the deterioration of each of the batteries 24a, 24b is prevented, thereby enabling a longer product life for the batteries 24a, 24b.

The electric power supply system 10 uses, as the plurality of electricity storage units, the output type battery 24a of high output and small capacity in combination with the capacity type battery 24b of low output and large capacity. The charge-discharge electric power of the two types of batteries 24a, 24b having respectively different charge-discharge characteristics is controlled by the controller 18. The controller 18 controls the charge-discharge electric power of each of the batteries 24a, 24b during the prediction period according to the charge-discharge schedule.

The charge-discharge schedule provides time-lapse transition of charge and discharge conditions of the plurality of batteries 24a, 24b during the prediction period based on (i) the predicted power consumption schedule, (ii) the predicted power generation schedule, and (iii) charge-discharge characteristics of each of the plurality of batteries 24a, 24b, such that the evaluation index that is used for selecting the charge-discharge schedule is provided as the optimal evaluation index. The evaluation index may be, for example, a price balance of the electric power or an emission amount of carbon dioxide. An optimal evaluation index may be provided as the lowest price balance of the electric power, when the evaluation index is the price balance. Also, for example, the optimal evaluation index may be provided as the lowest emission amount, if the evaluation index is provided as the emission amount of carbon dioxide.

The controller 18 controls the charge-discharge electric power of each of the plurality of batteries 24a, 24b according to the charge-discharge schedule. Therefore, even when there are two types of batteries 24a, 24b having respectively different charge-discharge characteristics, the control of those batteries 24a, 24b is performed in a manner that maximizes superior characteristics of respective batteries 24a, 24b, taking advantages of having at least two types of batteries 24a, 24b. Thus, the plurality of batteries 24a, 24b are efficiently used.

Further, the in-vehicle battery 14 disposed in the vehicle 20 may be used as the output type storage unit, which is capable of storing electric power from the power system and is capable of discharging electric power to the wiring 11. When the vehicle 20 is in use, the in-vehicle battery 14 will not be electrically coupled to the electric power supply system 10. Therefore, the system 10 determines the charge-discharge schedule in consideration of the use of the vehicle 20, and is able to take advantage of each of the plurality of batteries 24a, 24b and the in-vehicle battery 14 for controlling the charge-discharge electric power. Thus, the plurality of batteries 24a, 24b and the in-vehicle battery 14 are efficiently used.

Based on the predicted power consumption schedule, the predicted power generation schedule, a period during which the in-vehicle battery 14 is electrically coupled to the electric wiring 11, and the charge-discharge characteristics of each of the plurality of batteries 24a, 24b and the in-vehicle battery 14, the controller 18 determines a series of charge-discharge schedules and calculates the evaluation index for each schedule. The charge-discharge schedule with the optimal evaluation index, which may be a minimum or a maximum value depending on the evaluation index, is provided as the charge-discharge schedule to which the batteries 24a, 24b, and the in-vehicle battery 14 will be controlled.

Further, the evaluation index may be the electric power price balance that is calculated by subtracting, from the purchase price that is derived from multiplication of a unit purchase price by the supplied electric power amount from the electric wiring 11, the sell price that is derived from multiplication of a unit sell price by the reverse-flow electric power amount back to the wiring 11. Therefore, the controller 18 determines the charge-discharge schedule that provides the lowest electric power price balance (i.e. the optimal evaluation index), and controls the batteries 24a, 24b, and the in-vehicle battery 14 according to such charge-discharge schedule in order to achieve the optimal evaluation index.

Further, in the present embodiment, the charge-discharge schedule determination process is performed regularly for the prediction period between the current time and 24 hours later. Therefore, even when the weather prediction and/or the predicted consumption amount are incorrect, the charge-discharge schedule is updated and revised, thereby enabling a control of charge-discharge according to the updated and latest charge-discharge schedule.

The electric power supply system 10 can realize an improved efficiency of an energy management system as a combination of the plurality of batteries 24a, 24b. The currently developed and available battery is either an output type or a capacity type. The output type battery has a higher output capacity than the capacity type, but its storage capacity is smaller than the capacity type. The capacity type battery has a larger storage capacity than the output type, but its output capacity is lower than the output type. The battery having both of the two advantageous characteristics described above is not yet practically available in terms of price and ease of actual operation. However, as described above, the electric power supply system 10 of the present disclosure can realize an energy management system for use in a home (HEMS: Home Energy Management System) or in a building (BEMS: Building Energy Management System) which achieves the same level of energy efficiency of the high output large capacity battery, by combining the output type battery 24a with the capacity type battery 24b and by considering the capacities and restrictions of those batteries 24a, 24b, for the optimization of the charge-discharge schedule. Further, the output type battery 24a can be replaced with the in-vehicle battery 14, based on the vehicle to home (V2H) battery utilization design in view of the batteries used in the electric/hybrid vehicle.

Other Embodiments

Although the present disclosure has been fully described with reference to the accompanying drawings, it is to be noted that various changes and modifications will become apparent to those skilled in the art.

For instance, the charge-discharge schedule is calculated and determined for two storage units. However, the schedule may be calculated for three or more batteries. Therefore, for example, the charge-discharge schedule may be calculated and determined for the output type battery 24a, the capacity type battery 24b and the in-vehicle battery 14.

Further, the electric power price balance (La cost) is used as the evaluation index. However, other parameters may be used, such as an emission amount of carbon dioxide. When the evaluation index is the emission amount of carbon dioxide, the charge-discharge schedule is provided as a schedule that minimizes the emission amount of carbon dioxide.

Further, each of the batteries 24a, 24b is brought to a full charge condition in the mid-night time zone (i.e. 24:00 to 7:00). However, the charge condition of the batteries 24a, 24b may be a different charge condition, that is, may be brought to an optimum level that stores a required amount of electricity for the operation of the system in other time zones other than the mid-night time zone. For example, for the purpose of achieving energy saving and a lower running cost, the amount of photovoltaic power generation during daytime is predicted based on the weather prediction, and the optimized electric power storage amount in the mid-night time zone may be calculated and determined in consideration of both of the predicted amount of photovoltaic power generation and the predicted electric power consumption by the general electric load 12.

Further, the atmospheric pressure data is acquired from the atmospheric pressure sensor. However, by providing an access unit that provides connection to the internet, the atmospheric pressure data may be acquired from a meteorological agency through the Internet.

Further, LAN communication, RS communication, UART communication, PLC communication, and/or CPLT communication are used for communication between different components. However, different types of communication other than the above communications may be used for communication of information between those components. In addition, wireless communication may be used in addition to the wired communication.

Further, the building 30 is described as a house. However, the building 30 may also be a shop, a factory, a warehouse or the like.

Further, the time zone in which the batteries 24a, 24b is brought to a full charge condition is provided as the mid-night time zone between 24:00 and 7:00. However, such time zone may be defined differently, or may be changed to other time, according to the power supply contract. Further, the prediction period may be a period of time different from 24 hours, such as current time to 5 hours instead of 24 hours, or current time to 10 hours.

Further, the vehicle 20 having the in-vehicle battery 14 is described as a plug-in hybrid vehicle (PHV). However, the vehicle 20 may be, for example, an electric vehicle. Further, as long as the vehicle 20 is equipped with a battery, the electric power stored in the battery may not necessarily be used for driving the vehicle 20.

Such changes and modifications are to be understood as being within the scope of the present invention as defined by the appended claims.

What is claimed is:

1. An electric power supply system in a building for receiving an electric power from a power system of a power supplier and for providing the electric power through a wiring to an electric load, the electric power supply system comprising:
    a photovoltaic power generation unit generating photovoltaic electric power from sun light;
    a plurality of storage units storing the photovoltaic electric power from the photovoltaic power generation unit and the electric power from the power system, the plurality of storage units being coupled to the wiring of the building for discharging the electric power stored; and
    a consumption control unit controlling consumption of the electric power stored in the storage units from consumption by the electric load, by the storing of the electric power in each of the plurality of storage units, and by a reverse-flow of electric power back to the power system, wherein
    the plurality of storage units include at least two types of storage units with respectively different charge-discharge characteristics including an output type storage unit of high output and small capacity and a capacity type storage unit of low output and large capacity,
    the consumption control unit determines for each of the storage units a charge-discharge schedule to control a charge-discharge of electric power of each of the storage units during a prediction period based on (i) a predicted power consumption schedule providing transitional electric power consumption during the prediction period by the electric load based on a use history of the electric load, (ii) a predicted power generation schedule providing transitional electric power generation during the prediction period by the photovoltaic power generation unit based on forecasted weather, and (iii) the charge-discharge characteristics of each of the storage units, and
    the consumption control unit determines the charge-discharge schedule by way of an evaluation index, the evaluation index is calculated for a charge-discharge schedule, and the consumption control unit controls the charge-discharge of electric power of each of the storage units according to the charge-discharge schedule having an optimal evaluation index.

2. The electric power supply system of claim 1, further comprising:
    an in-vehicle storage unit of a vehicle, the in-vehicle storage unit storing and discharging electric power to the wiring and being an output type storage unit, and
    the consumption control unit determines the charge-discharge schedule as having an optimal evaluation index, based on the predicted power consumption schedule, the predicted power generation schedule, a connection period during which the in-vehicle storage unit is electrically coupled to the wiring, and the charge-discharge characteristics of each of the plurality of storage units including the in-vehicle storage unit.

3. The electric power supply system of claim 1, wherein
    the evaluation index is an electric power price balance that is calculated by subtracting a sell price of electric power according to the amount of reverse-flow of electric power back to the wiring from a purchase price of electric power according to the amount of electric power from the wiring, and
    the optimal evaluation index is an electric power price balance having the lowest value.

4. The electric power supply system of claim 1, wherein
    the evaluation index is an emission amount of carbon dioxide according to the amount of electric power from the wiring, and
    the optimal evaluation index is an emission amount having the lowest value.

\* \* \* \* \*